US009283845B2

(12) United States Patent
Inuzuka et al.

(10) Patent No.: US 9,283,845 B2
(45) Date of Patent: Mar. 15, 2016

(54) ACCELERATOR APPARATUS FOR VEHICLE

(71) Applicant: DENSO CORPORATION, Kariya, Aichi-pref. (JP)

(72) Inventors: Yoshinori Inuzuka, Okazaki (JP); Masahiro Makino, Kariya (JP); Takehiro Saito, Anjo (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 14/061,918

(22) Filed: Oct. 24, 2013

(65) Prior Publication Data

US 2014/0116381 A1    May 1, 2014

(30) Foreign Application Priority Data

Oct. 31, 2012 (JP) ................................. 2012-240121

(51) Int. Cl.
*B60K 26/02* (2006.01)
*F02D 11/02* (2006.01)
*G05G 5/03* (2008.04)

(52) U.S. Cl.
CPC ............... *B60K 26/02* (2013.01); *F02D 11/02* (2013.01); *G05G 5/03* (2013.01)

(58) Field of Classification Search
USPC .................. 123/370, 406.25, 406.36, 406.46, 123/406.5, 406.51, 675, 682, 492
See application file for complete search history.

(56) References Cited

U.S. PATENT DOCUMENTS

| 3,972,190 | A | * | 8/1976 | Sawyer ............................. 60/551 |
| 5,934,152 | A | * | 8/1999 | Aschoff et al. .................. 74/513 |
| 6,275,024 | B1 | * | 8/2001 | Uneme et al. ............ 324/207.17 |
| 6,289,762 | B1 | * | 9/2001 | Silva ............................... 74/513 |
| 6,675,923 | B1 | * | 1/2004 | Artis .................... B60K 26/021  180/170 |
| 6,722,225 | B1 | * | 4/2004 | Martinovsky .................... 74/512 |
| 2002/0100341 | A1 | * | 8/2002 | Kumamoto .......... B60K 26/021  74/512 |
| 2007/0095163 | A1 | * | 5/2007 | Meguro .......................... 74/513 |
| 2009/0183589 | A1 | * | 7/2009 | Watanabe et al. ............... 74/513 |
| 2010/0083789 | A1 | * | 4/2010 | Osawa ................... B60K 26/02  74/513 |
| 2010/0294074 | A1 | * | 11/2010 | Muraji et al. .................... 74/514 |
| 2012/0297920 | A1 | * | 11/2012 | Saito .................... B60K 26/021  74/513 |
| 2013/0091977 | A1 |   | 4/2013 | Fukushima et al. |
| 2013/0133466 | A1 | * | 5/2013 | Inuzuka ................... G05G 5/03  74/513 |
| 2013/0160600 | A1 | * | 6/2013 | Saito ........................ G05G 1/44  74/513 |

FOREIGN PATENT DOCUMENTS

| JP | 60-152824 | 10/1985 |
| JP | 11-350985 | 12/1999 |
| JP | 11-350988 | 12/1999 |
| JP | 2004-90755 | 3/2004 |
| JP | 2010-158992 | 7/2010 |
| JP | 2011-251667 | 12/2011 |

* cited by examiner

*Primary Examiner* — Hung Q Nguyen
*Assistant Examiner* — Brian P Monahon
(74) *Attorney, Agent, or Firm* — Nixon & Vanderhye P.C.

(57) ABSTRACT

An accelerator pedal is urged in an accelerator closing direction by a hysteresis spring and a return spring. A first increase rate is obtained by dividing an urging force of the hysteresis spring exerted in an accelerator-full-opening position of the accelerator pedal by the urging force of the hysteresis spring exerted in an accelerator-full-closing position of the accelerator pedal. A second increase rate is obtained by dividing an urging force of the return spring exerted in the accelerator-full-opening position of the accelerator pedal by the urging force of the return spring exerted in the accelerator-full-closing position of the accelerator pedal. The second increase rate is smaller than the first increase rate.

5 Claims, 10 Drawing Sheets

ACCELERATOR APPARATUS FOR VEHICLE

CROSS REFERENCE TO RELATED APPLICATION

This application is based on and incorporates herein by reference Japanese Patent Application No. 2012-240121 filed on Oct. 31, 2012.

TECHNICAL FIELD

The present disclosure relates to an accelerator apparatus for a vehicle.

BACKGROUND

An accelerator apparatus of an electronic type is known. In this accelerator apparatus, the amount of depression of an accelerator pedal is sensed with a sensor, and the sensor outputs an electrical signal, which indicates the sensed amount of depression of the accelerator pedal, to an electronic control device. For example, the accelerator apparatus of JP2010-158992A includes a pedal rotor and a return rotor. An accelerator pedal is connected to the pedal rotor, and the return rotor is rotatable relative to the pedal rotor. A return spring urges the return rotor in an accelerator closing direction. Furthermore, bevel gear teeth are integrally formed in the pedal rotor such that the bevel gear teeth project toward the return rotor. Also, bevel gear teeth are integrally formed in the return rotor such that the bevel gear teeth project toward the pedal rotor. When the pedal rotor is rotated from an accelerator full-closing position in an accelerator opening direction, the bevel gear teeth of the pedal rotor are engaged with the bevel gear teeth of the return rotor to urge the pedal rotor and the return rotor away from each other.

When the pedal rotor is displaced away from the return rotor, the pedal rotor receives a rotational resistance force through frictional engagement with a first friction member, which is fixed to a support member. When the return rotor is displaced away from the pedal rotor, the return rotor receives a rotational resistance force from a second friction member, which is fixed to the return rotor, by urging the second friction member against the support member. These rotational resistance forces are exerted to maintain the rotation of the accelerator pedal and generate a property of that the pedal force at the time of depressing the accelerator pedal toward a floor is smaller than the pedal force at the time of returning the accelerator pedal away from the floor. This property is referred to as a pedal force hysteresis property. The pedal rotor, the return rotor and the two sets of the bevel gear teeth form a resistance application device, which generates the pedal force hysteresis property.

A value, which is obtained by dividing "a pedal force difference between the pedal force at the time of depressing the accelerator pedal and the pedal force at the time of returning the accelerator pedal" by "the pedal force at the time of depressing the accelerator pedal", will be referred to as a hysteresis ratio. The inventors of the present application have found that the operability of the accelerator pedal is improved when the hysteresis ratio discussed above is increased from the accelerator-full-closing position of the accelerator pedal (the accelerator-full-closing time) to the accelerator-full-opening position of the accelerator pedal (the accelerator-full-opening time).

In contrast to this finding, in the accelerator apparatus of JP2010-158992A, the urging force, which is exerted by the return spring, is increased or decreased at a constant ratio by the resistance application device and is conducted to the pedal boss. Therefore, the hysteresis ratio is constant throughout a rotational range of the accelerator pedal, which is from the accelerator-full-closing position of the accelerator pedal (the accelerator-full-closing time) to the accelerator-full-opening position of the accelerator pedal (the accelerator-full-opening time), and there is a need for improving the operability of the accelerator pedal.

SUMMARY

The present disclosure is made in view of the above points. According to the present disclosure, there is provided an accelerator apparatus for a vehicle, including a support member, an accelerator pedal, a rotational angle sensing device, a resistance force application device, a first urging device and a second urging device. The support member is installable to a body of the vehicle. The accelerator pedal is supported by the support member. The accelerator pedal is rotatable in an accelerator opening direction when a pedal force is applied to the accelerator pedal. The accelerator pedal is rotatable in an accelerator closing direction, which is opposite from the accelerator opening direction, when the pedal force applied to the accelerator pedal is reduced. The rotational angle sensing device senses a rotational angle of the accelerator pedal relative to the support member. The resistance force application device applies a rotational resistance force to the accelerator pedal. The rotational resistance force, which is applied from the resistance force application device to the accelerator pedal, is increased in response to an increase in a rotational angle of the accelerator pedal in the accelerator opening direction from an accelerator-full-closing position of the accelerator pedal. The first urging device exerts an urging force, which is conducted to the accelerator pedal through the resistance force application device to urge the accelerator pedal in the accelerator closing direction. The second urging device exerts an urging force, which is conducted to the accelerator pedal without passing through the resistance force application device to urge the accelerator pedal in the accelerator closing direction. The first urging device has a first increase rate that is obtained by dividing the urging force of the first urging device, which is exerted to the accelerator pedal in an accelerator-full-opening position of the accelerator pedal, by the urging force of the first urging device, which is exerted to the accelerator pedal in the accelerator-full-closing position of the accelerator pedal. The second urging device has a second increase rate that is obtained by dividing the urging force of the second urging device, which is exerted to the accelerator pedal in the accelerator-full-opening position of the accelerator pedal, by the urging force of the second urging device, which is exerted to the accelerator pedal in the accelerator-full-closing position of the accelerator pedal. The second increase rate is smaller than the first increase rate.

The first increase rate of the first urging device and the second increase rate of the second urging device discussed above may be modified as follows. That is, the first urging device has a first increase rate that is obtained by dividing the urging force of the first urging device, which is exerted to the accelerator pedal in a second rotational position of the accelerator pedal, by the urging force of the first urging device, which is exerted to the accelerator pedal in a first rotational position of the accelerator pedal. The second rotational position of the accelerator pedal is located on one side of the first rotational position in the accelerator opening direction. The second urging device has a second increase rate that is obtained by dividing the urging force of the second urging device, which is exerted to the accelerator pedal in the second rotational position of the accelerator pedal, by the urging force of the second urging device, which is exerted to the accelerator pedal in the first rotational position of the accelerator pedal. The second increase rate is smaller than the first increase rate.

BRIEF DESCRIPTION OF THE DRAWINGS

The drawings described herein are for illustration purposes only and are not intended to limit the scope of the present disclosure in any way.

DETAILED DESCRIPTION

Figure 1:
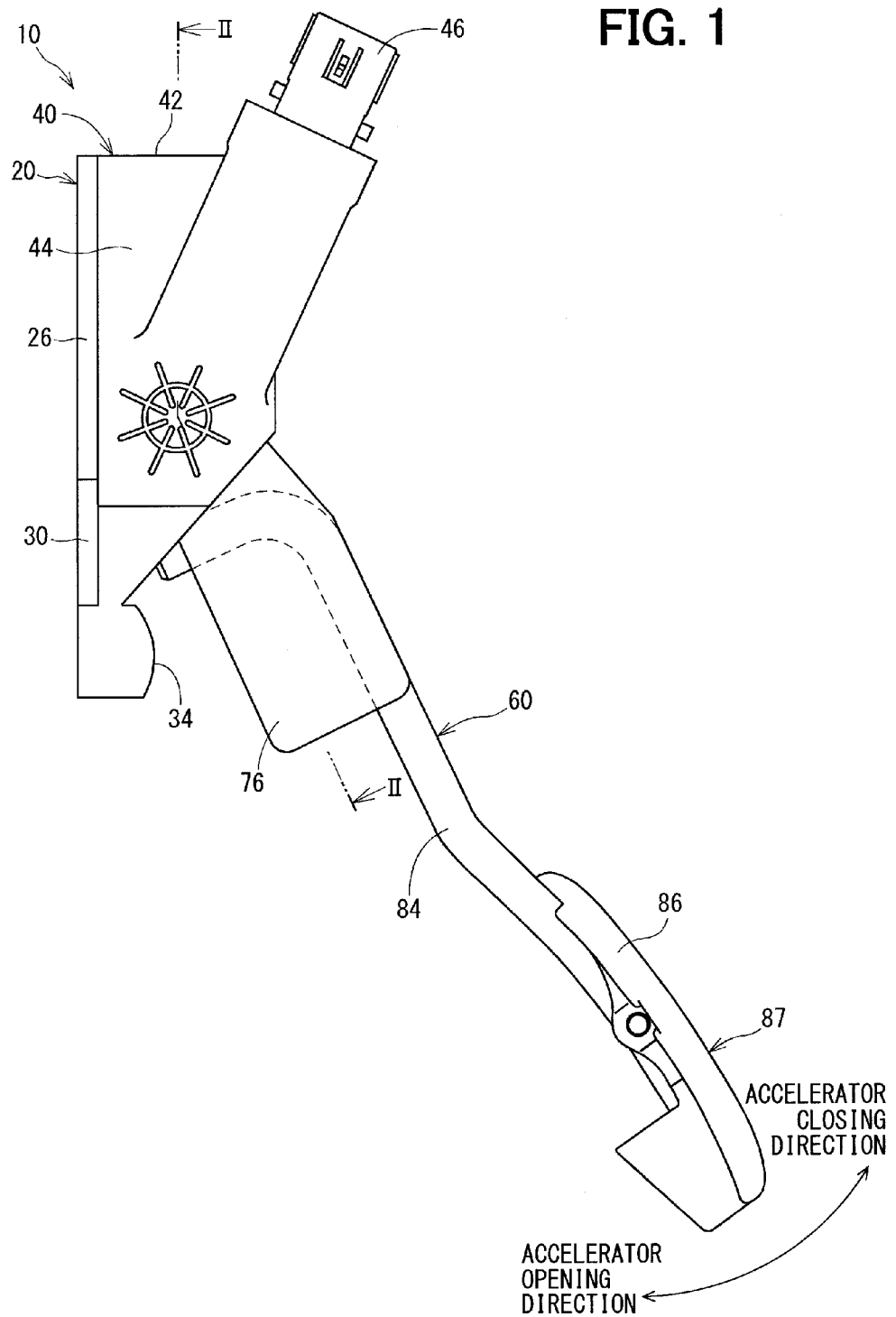
FIG. 1 is a schematic side view showing an entire structure of an accelerator apparatus according to a first embodiment of the present disclosure.
Figure 2:
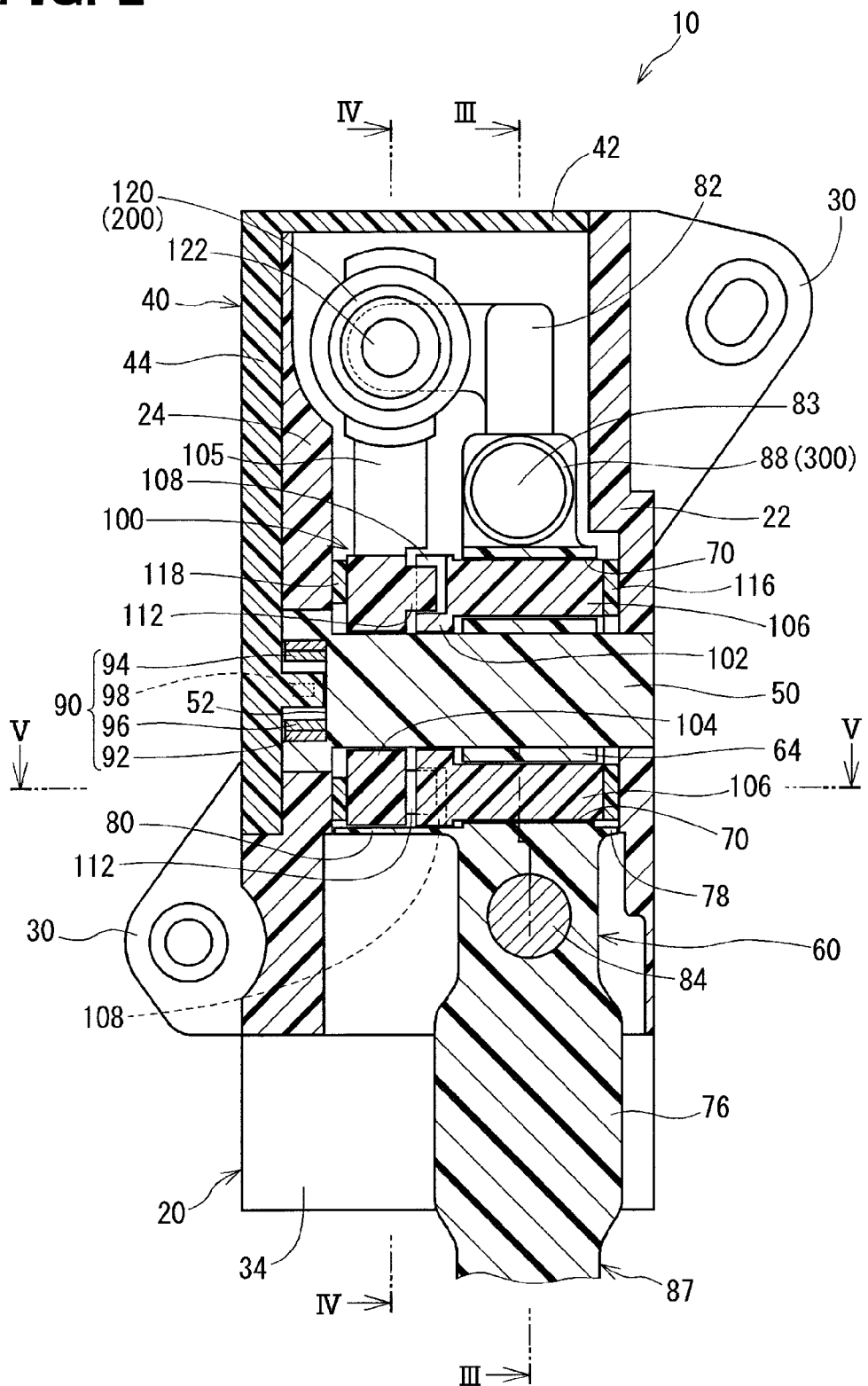
FIG. 2 is a cross sectional view taken along line II-II in FIG. 1.
Figure 3:
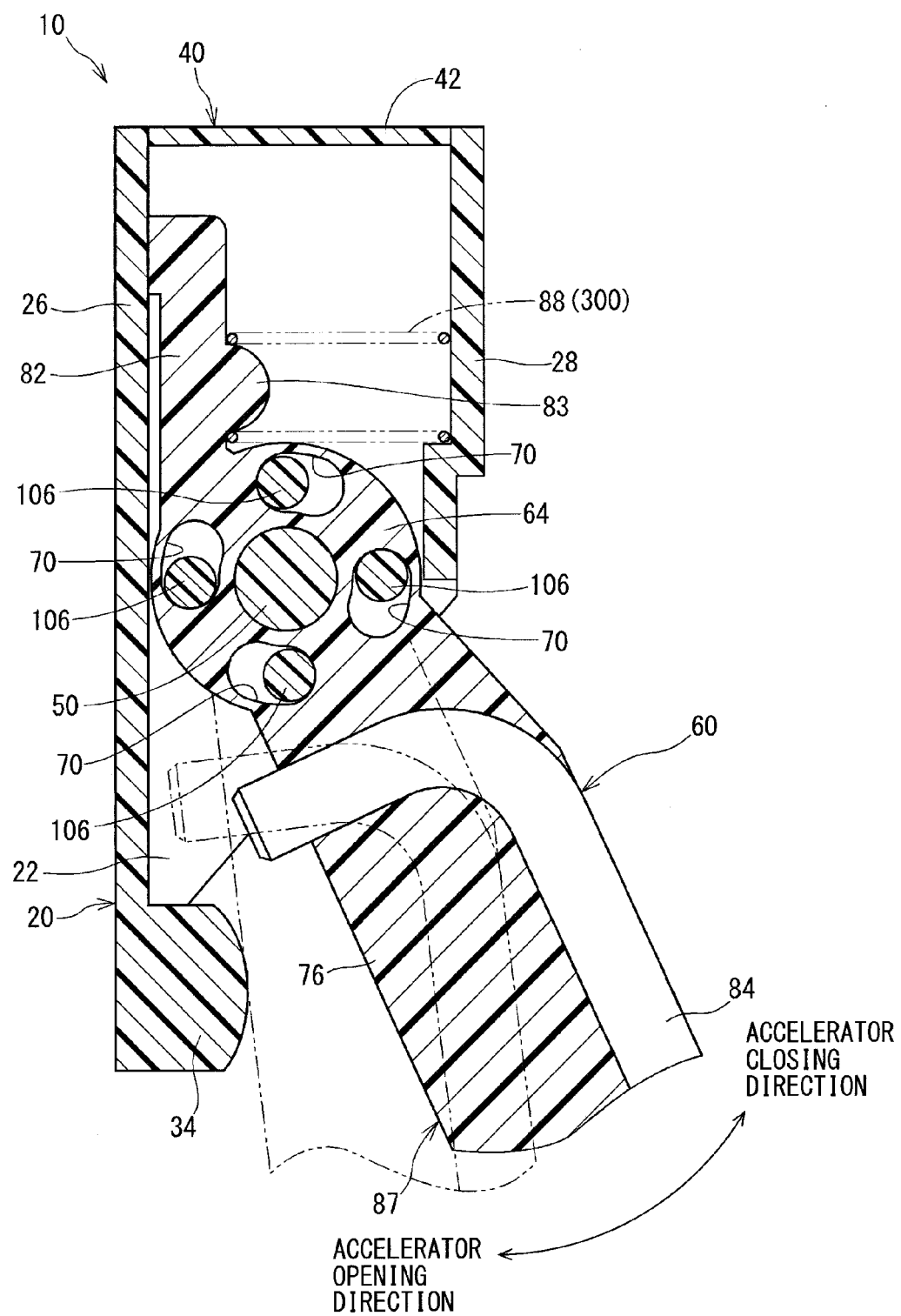
FIG. 3 is a cross sectional view taken along line III-III in FIG. 2.
Figure 4:
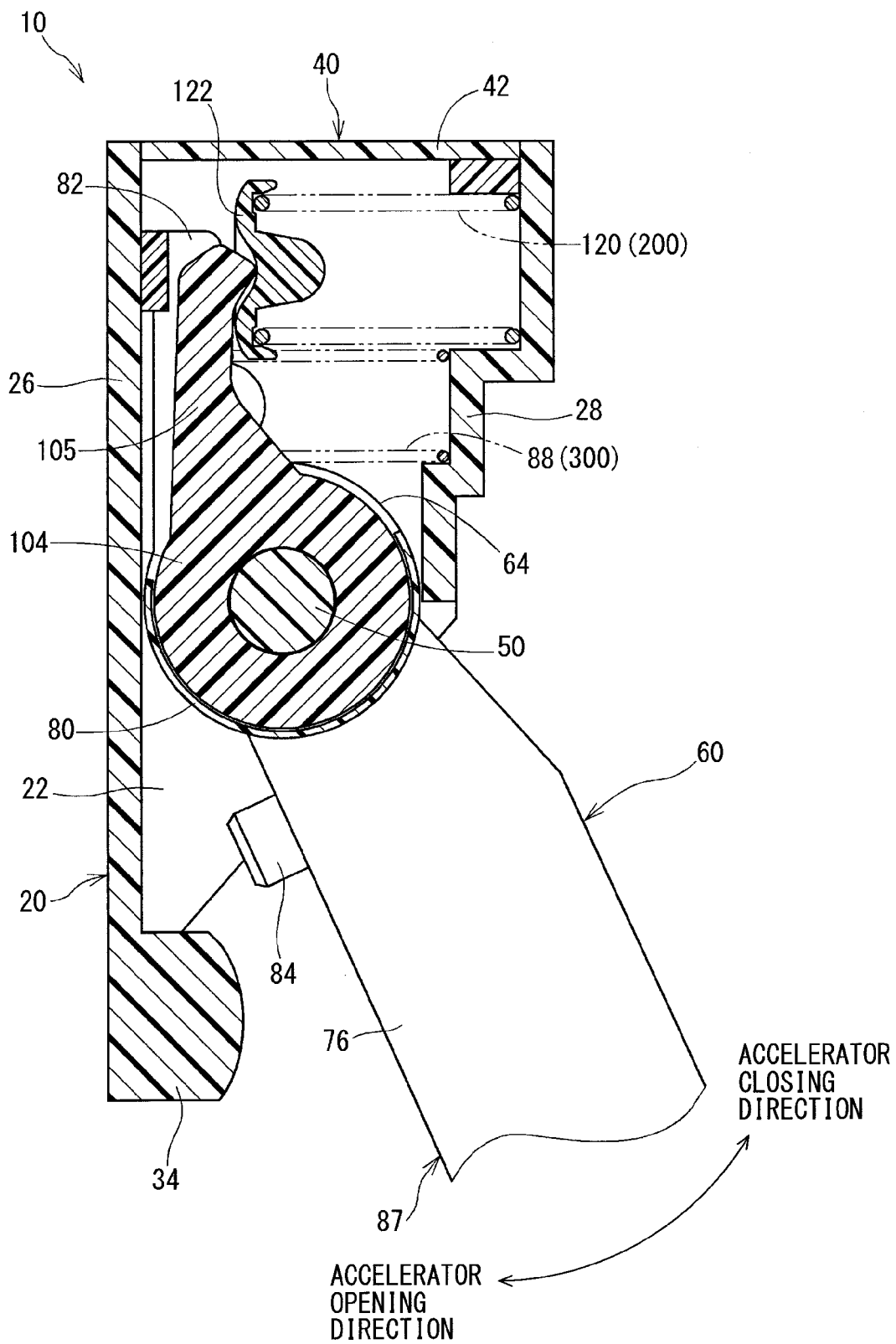
FIG. 4 is a cross sectional view taken along line IV-IV in FIG. 2.
Figure 5:
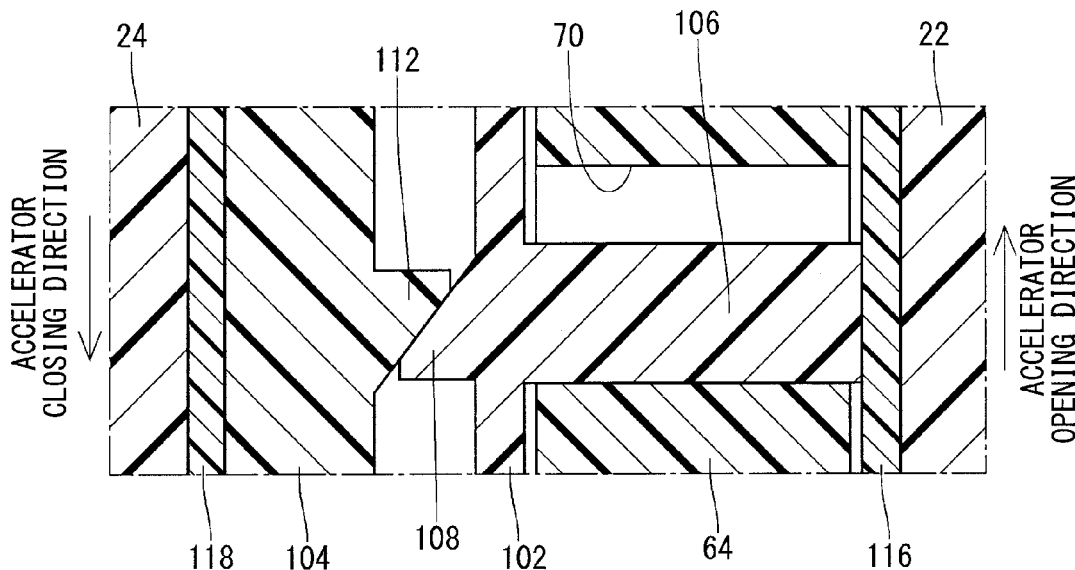
FIG. 5 is an enlarged cross-sectional view taken along line V-V in FIG. 2 showing one of projections, one of first bevel gear teeth and one of second bevel gear teeth of the accelerator apparatus.

Various embodiments of the present disclosure will be described with reference to the accompanying drawings. In the following discussion of the embodiments, similar components will be indicated by the same reference numerals and will not be described redundantly for the sake of simplicity.

First Embodiment

FIG. 1 shows an accelerator apparatus according to a first embodiment of the present disclosure. The accelerator apparatus 10 is an input apparatus, which is manipulated by a driver of a vehicle (e.g., an automobile) to determine a valve opening degree of a throttle valve (e.g., a butterfly valve) of an internal combustion engine of the vehicle (not shown). The accelerator apparatus 10 is of an electronic type that transmits an electrical signal, which indicates the amount of depression of an accelerator pedal 87 by the foot of the driver of the vehicle, to an electronic control device (not shown). The electronic control device drives the throttle valve based on the amount of depression of the pedal 87 and the other information.

Now, a structure of the accelerator apparatus 10 will be described with reference to FIGS. 1 to 5. The accelerator apparatus 10 of FIGS. 1 to 4 is indicated in its installation position relative to a vehicle body (not shown). In the following discussion, a top-to-bottom direction of FIGS. 1 to 4 will be described as a top-to-bottom direction of the accelerator apparatus 10.

The accelerator apparatus 10 includes a housing 20, a cover 40, a shaft 50, a manipulation member 60, a return spring 88, a rotational position sensor 90, a resistance application device (also referred to as a resistance application means) 100 and a hysteresis spring 120. The housing 20 may serve as a support member of the present disclosure. The return spring (urging element) 88 forms a second urging device (a second urging means) 300. The second urging device 300 (more specifically the return spring 88) exerts an urging force, which is conducted to the accelerator pedal 87 without passing through the resistance force application device 100 to urge the accelerator pedal 87 in the accelerator closing direction. The rotational position sensor 90 may serve as a rotational angle sensing device (also referred to as a rotational angle sensing means) of the present disclosure. The hysteresis spring (urging element) 120 forms a first urging device (a first urging means) 200. The first urging device 200 (more specifically the hysteresis spring 120) exerts an urging force, which is conducted to the accelerator pedal 87 through the resistance force application device 100 to urge the accelerator pedal 87 in the accelerator closing direction.

The housing 20 is configured into a quadrangular tube form, which extends in the top-to-bottom direction. The housing 20 includes a bearing segment 22, a bearing segment 24, a connecting segment 26 and a connecting segment 28. The bearing segment 22 and the bearing segment 24 are opposed to each other, and the connecting segment 26 and the connecting segment 28 are opposed to each other. The connecting segment 26 has installation portions 30 and an opening direction stopper 34, which are formed integrally in the connecting segment 26. The installation portions 30 can be fixed to the vehicle body (not shown) with, for example, bolts. The manipulation member 60 is rotatable in an accelerator opening direction and an accelerator closing direction, which are opposite to each other (see, for example, FIG. 1). When the manipulation member 60 is depressed with a pedal force, which is applied to the manipulation member 60 by a foot of the driver, toward a floor of a passenger compartment of the vehicle, the manipulation member 60 is rotated in the accelerator opening direction. In contrast, when the manipulation member 60 is returned away from the floor of the passenger compartment by reducing the applied pedal force, the manipulation member 60 is rotated in the accelerator closing direction. Furthermore, when the opening direction stopper 34 contacts the manipulation member 60 upon the rotation of the manipulation member 60 in the accelerator opening direction, the opening direction stopper 34 limits rotation of the manipulation member 60 in the accelerator opening direction.

The cover 40 includes a covering portion 42, a fixing portion 44 and a connector 46. The covering portion 42 closes an upper opening of the housing 20. The fixing portion 44 extends downward from the covering portion 42 and is fixed to the bearing segment 24. The connector 46 extends upward from the fixing portion 44.

The shaft 50 is rotatably supported by the bearing segments 22, 24 of the housing 20. A receiving hole 52 is formed in one end portion of the shaft 50, and a sensing device of the rotational position sensor 90 is received in the receiving hole 52. The shaft 50 rotates within a predetermined angular range (rotatable angular range) in response to a torque, which is inputted from the manipulation member 60 upon a depressing operation of the manipulation member 60 by the driver (an operator).

The manipulation member 60 includes a pedal boss 64, a rod connecting portion 76, a cover 78, a cover 80, a closing direction stopper 82, a rod 84 and a pad 86. The pedal boss 64 is configured into an annular form and is located between the bearing segment 22 and the bearing segment 24 in the housing 20. The pedal boss 64 is fixed to the shaft 50 by, for example, press-fitting. The rod connecting portion 76 is formed integrally with the pedal boss 64 such that the rod connecting portion 76 extends downward from the pedal boss 64 through a lower opening of the housing 20. The cover 78 is formed integrally with the pedal boss 64 such that the cover 78 extends from a lower edge part of a bearing segment 22 side end surface of the pedal boss 64 toward the bearing segment 22 side. The cover 80 is formed integrally with the pedal boss 64 such that the cover 80 extends from a lower edge part of a bearing segment 24 side end surface of the pedal boss 64 toward the bearing segment 24. Each of the cover 78 and the cover 80 closes a corresponding gap between the housing 20 and the pedal boss 64.

The closing direction stopper 82 is formed integrally with the pedal boss 64 such that the closing direction stopper 82 extends upward from the pedal boss 64. When the closing direction stopper 82 contacts the connecting segment 26 of the housing 20, the closing direction stopper 82 limits rotation of the manipulation member 60 in the accelerator closing direction. One end portion of the rod 84 is fixed to the rod connecting portion 76, and the other end portion of the rod 84 extends downward. The pad 86 is fixed to the other end portion of the rod 84. The rod connecting portion 76, the rod 84 and the pad 86 form the accelerator pedal 87.

The return spring 88 is formed as a compression coil spring. One end portion of the return spring 88 is engaged with a projection 83 of the closing direction stopper 82, and the other end portion of the return spring 88 is engaged with the connecting segment 28. The return spring 88 exerts the urging force, which is conducted to the manipulation member 60 without passing through the resistance application device 100 to urge the manipulation member 60 in the accelerator closing direction.

The rotational position sensor 90 includes a yoke 92, a magnet 94, a magnet 96 and a Hall element 98. The yoke 92 is made of a magnetic material and is configured into a tubular form. The yoke 92 is fixed to an inner wall of the receiving hole 52 of the shaft 50. The magnet 94 and the magnet 96 are opposed to each other about the rotational axis of the shaft 50 and are fixed to an inner wall of the yoke 92. The Hall element 98 is placed at a rotational axis of the shaft 50 and is fixed to the cover 40. The rotational position sensor 90 senses the rotational angle of the accelerator pedal 87 relative to the housing 20 based on an output voltage of the Hall element 98, which changes at the time of rotating the magnets 94, 96 together with the shaft 50.

The resistance application device 100 includes a first rotor 102, a second rotor 104, first-bevel-gear teeth 108, second-bevel-gear teeth 112, a first friction member 116 and a second friction member 118. The first rotor 102 and the second rotor 104 may serve as rotors of the present disclosure. The first friction member 116 and the second friction member 118 may serve as friction members of the present disclosure.

The first rotor 102 is configured into an annular form and is fitted to the shaft 50 at a corresponding location between the pedal boss 64 and the bearing segment 24 of the housing 20. The first rotor 102 has a plurality of projections 106, each of which is configured into a cylindrical form and projects toward the bearing segment 22 of the housing 20. Each projection 106 extends through a corresponding one of a plurality of through-holes 70 of the pedal boss 64 and is circumferentially abuttable against an inner peripheral wall of the corresponding through-hole 70. The first rotor 102 is rotatable relative to the shaft 50 and the pedal boss 64. Furthermore, the first rotor 102 is axially movable toward and away from the bearing segment 22 of the housing 20.

When each projection 106 abuts against the inner peripheral wall of the corresponding through-hole 70 of the pedal boss 64, the rotation is transmitted between the pedal boss 64 and the first rotor 102. Specifically, the rotation of the pedal boss 64 in the accelerator opening direction is conducted to the first rotor 102 through the inner peripheral wall of each through-hole 70 and the corresponding projection 106. Furthermore, the rotation of the first rotor 102 in the accelerator closing direction is conducted to the pedal boss 64 through each projection 106 and the inner peripheral wall of the corresponding through-hole 70. The pedal boss 64 and the projections 106 serve as a rotation transmitting device (coupler), which couples between the accelerator pedal 87 and the first rotor 102 in a manner that enables conduction of the rotation therebetween.

The second rotor 104 is configured into an annular form and is fitted to the shaft 50 at a corresponding location between the first rotor 102 and the bearing segment 24 of the housing 20. The second rotor 104 is rotatable relative to the shaft 50 and the first rotor 102. Furthermore, the second rotor 104 is axially movable toward and away from the bearing segment 24 of the housing 20.

The first-bevel-gear teeth 108 are formed integrally with a second rotor 104 side end portion of the first rotor 102 such that the first-bevel-gear teeth 108 are arranged one after another at generally equal intervals in the circumferential direction. Each of the first-bevel-gear teeth 108 is sloped such that a projecting length (an axial projecting length) of a sloped surface of each of the first-bevel-gear teeth 108 progressively increases in the accelerator closing direction.

The second-bevel-gear teeth 112 are formed integrally with a first rotor 102 side end portion of the second rotor 104 such that the second-bevel-gear teeth 112 are arranged one after another at generally equal intervals in the circumferential direction. Each of the second-bevel-gear teeth 112 is sloped such that a projecting length (an axial projecting length) of a sloped surface of each of the second-bevel-gear teeth 112 progressively increases in the accelerator opening direction.

The first-bevel-gear teeth 108 and the second-bevel-gear teeth 112 are arranged to conduct the rotation between the first rotor 102 and the second rotor 104 through the contact between the sloped surfaces of the first-bevel-gear teeth 108 and the sloped surfaces of the second-bevel gear teeth 112. Specifically, the rotation of the first rotor 102 in the accelerator opening direction can be conducted to the second rotor 104 through the first-bevel-gear teeth 108 and the secondbevel-gear teeth 112. Furthermore, the rotation of the second rotor 104 in the accelerator closing direction can be conducted to the first rotor 102 through the second-bevel-gear teeth 112 and the first-bevel-gear teeth 108.

When the first rotor 102 is rotated in the accelerator opening direction, the sloped surfaces of the first-bevel-gear teeth 108 contact the sloped surfaces of the second-bevel-gear teeth 112 to urge the first rotor 102 and the second rotor 104 away from each other in the axial direction of the shaft 50. At this time, when a rotational angle of the first rotor 102 in the accelerator opening direction is increased, an urging force of the first-bevel-gear teeth 108, which urges the first rotor 102 toward the bearing segment 22 of the housing 20 in the axial direction of the shaft 50, is increased. Furthermore, when the rotational angle of the first rotor 102 in the accelerator opening direction is increased, the urging force of the second bevel-gear teeth 112, which urges the second rotor 104 toward the bearing segment 24 of the housing 20 in the axial direction of the shaft 50, is increased.

The first friction member 116 is axially placed between the projections 106 and the bearing segment 22 of the housing 20 and is fixed to the projections 106. When the first rotor 102 is urged away from the second rotor 104 in the axial direction, the first friction member 116 is urged against the bearing segment 22 of the housing 20 through the projections 106 of the first rotor 102. At this time, the first friction member 116 exerts the rotational resistance force to the first rotor 102 through the frictional engagement between the first friction member 116 and the bearing segment 22 of the housing 20. This rotational resistance force is increased when the urging force, which is exerted from the first rotor 102 to the first friction member 116, is increased.

The second friction member 118 is axially placed between the second rotor 104 and the bearing segment 24 of the housing 20 and is fixed to the second rotor 104. When the second rotor 104 is urged away from the first rotor 102 in the axial direction, the second friction member 118 is urged against the bearing segment 24 of the housing 20 through the second rotor 104. At this time, the second friction member 118 exerts the rotational resistance force to the second rotor 104 through the frictional engagement between the second friction member 118 and the bearing segment 24 of the housing 20. This rotational resistance force is increased when the urging force, which is exerted from the second rotor 104 to the second friction member 118, is increased.

The hysteresis spring 120 is formed as a compression coil spring. One end portion of the hysteresis spring 120 is engaged with a receiving member 122, which is engaged with an engaging portion 105 of the second rotor 104. The other end portion of the hysteresis spring 120, which is opposite from the one end portion of the hysteresis spring 120, is engaged with the connecting segment 28 of the housing 20. The hysteresis spring 120 urges the second rotor 104 in the accelerator closing direction. The urging force of the hysteresis spring 120 is increased when the rotational angle of the second rotor 104 in the accelerator opening direction is increased.

The urging force of the hysteresis spring 120 is conducted to the pedal boss 64 through the resistance application device 100. This urging force of the hysteresis spring 120 acts as a first reaction force that is applied to the operator (the driver of the vehicle) at the time of depressing the accelerator pedal 87. The first reaction force differs between the time of depressing the accelerator pedal 87 (see a solid line in FIG. 6) and the time of releasing the accelerator pedal 87 (see a dot-dash-line in FIG. 6). Specifically, the first reaction force becomes equal to a sum (see a dotted line in FIG. 6) of the urging force of the hysteresis spring 120 and the rotational resistance force of the resistance application device 100 at the time of rotating the pedal boss 64 in the accelerator opening direction through the depression of the accelerator pedal 87. Furthermore, the first reaction force becomes equal to a difference that is obtained by subtracting the rotational resistance force, which is exerted by the resistance application device 100, from the urging force, which is exerted by the hysteresis spring 120, at the time of rotating the pedal boss 64 in the accelerator closing direction by returning the accelerator pedal 87 away from the floor of the passenger compartment of the vehicle.

Figure 6:
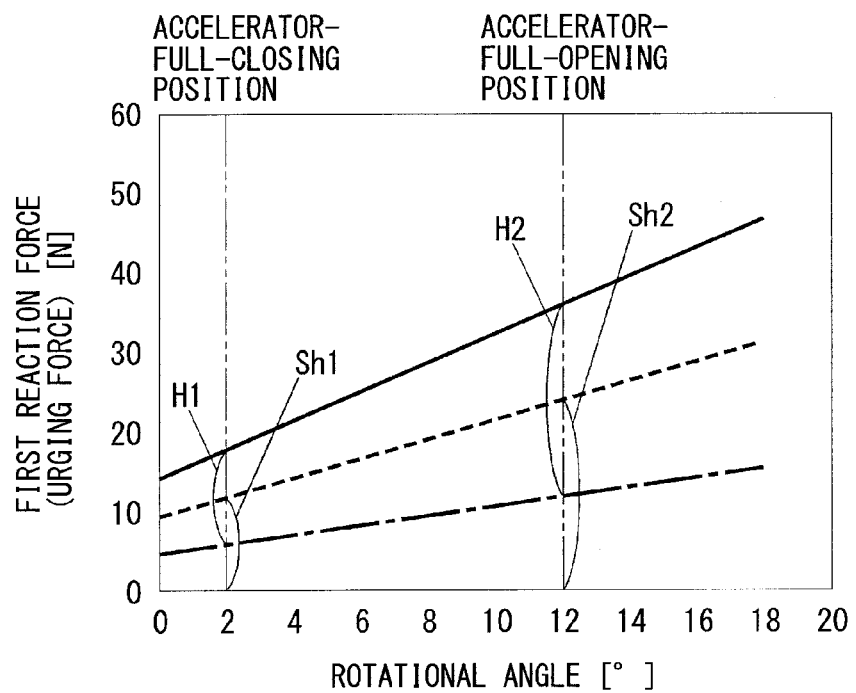
FIG. 6 is a characteristic diagram showing a relationship between a first reaction force, which is applied to a foot of an operator at the time of operating the accelerator pedal shown in FIG. 1, and a rotational angle of the accelerator pedal.

As shown in FIG. 6, in the present embodiment, the accelerator pedal 87 is rotatable within a rotatable angular range of 0 to 18 degrees relative to the housing 20. In FIG. 6, the rotational angle of 0 degrees is an initial rotational position of the accelerator pedal 87 that is a released position of the accelerator pedal 87. In the released position of the accelerator pedal 87, the foot of the driver is fully removed from the accelerator pedal 87, so that the pedal force is not applied to the accelerator pedal 87. Furthermore, a full-closing position of the accelerator pedal 87 (hereinafter referred to as an accelerator-full-closing position) is set at a rotational angle of 2 degrees (or a rotational angle adjacent to 2 degrees), and an accelerator full-opening position of the accelerator pedal 87 (hereinafter referred to as an accelerator-full-opening position) is set at a rotational angle of 12 degrees (or a rotational angle adjacent to 12 degrees). Furthermore, a relationship between the rotational angle of the accelerator pedal 87 and the first reaction force is linear at the time of depressing the accelerator pedal 87 and at the time of returning the accelerator pedal 87.

Hereinafter, the urging force of the hysteresis spring 120, which is exerted to the accelerator pedal 87 in the accelerator-full-closing position (the accelerator-full closing time) of the accelerator pedal 87, will be denoted as "Sh1", and the urging force of the hysteresis spring 120, which is exerted to the accelerator pedal 87 in the accelerator-full-opening position (the accelerator-full opening time) of the accelerator pedal 87, will be denoted as "Sh2." In such a case, a first increase rate α of the hysteresis spring 120 is defined with the following equation (1). That is, the first increase rate α is a value, which is obtained by dividing the urging force Sh2 by the urging force Sh1.

$$\alpha = Sh2/Sh1 \qquad \text{Equation (1)}$$

Furthermore, a value, which is obtained by dividing the rotational resistance force of the resistance application device 100 by the urging force of the hysteresis spring 120, will be referred to as a hysteresis conversion factor K. Also, a difference between the first reaction force at the time of depressing the accelerator pedal 87 and the first reaction force at the time of returning the accelerator pedal 87 in the accelerator-full-closing position of the accelerator pedal 87 (the accelerator-full-closing time) will be referred to as a hysteresis width H1. Furthermore, a difference between the first reaction force at the time of depressing the accelerator pedal 87 and the first reaction force at the time of returning the accelerator pedal 87 in the accelerator-full-opening position of the accelerator pedal 87 (the accelerator-full-opening time) will be referred to as a hysteresis width H2. In such a case, the hysteresis width H1 is expressed by the following equation (2), and the hysteresis width H2 is expressed by the following equation (3).

$$H1 = 2K \times Sh1 \qquad \text{Equation (2)}$$

$$H2 = 2K \times Sh2 = 2K \times \alpha \times Sh1 \qquad \text{Equation (3)}$$

Figure 7:
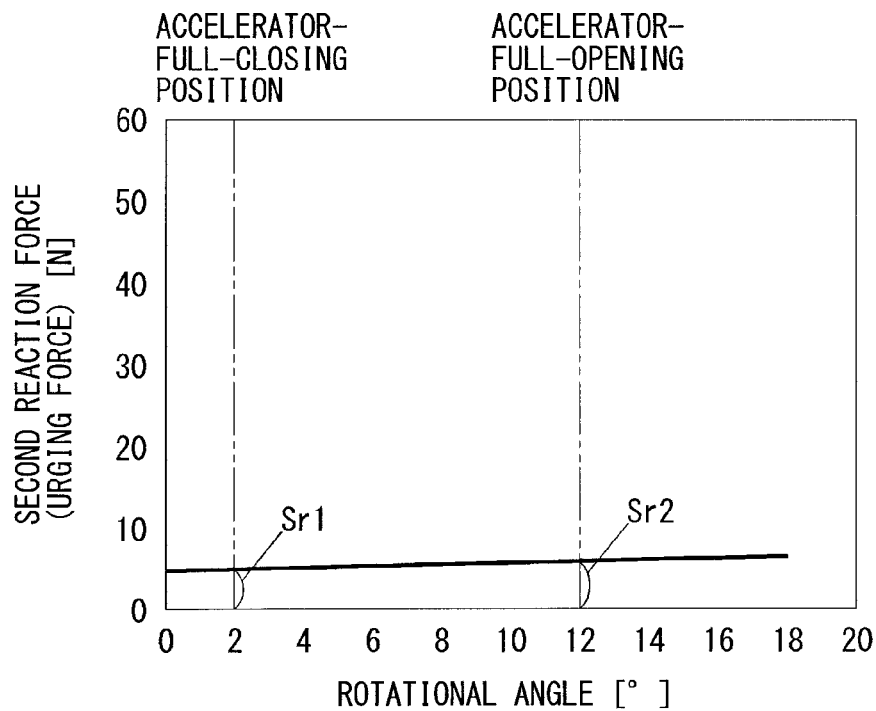
FIG. 7 is a characteristic diagram showing a relationship between an urging force generated by a return spring of the accelerator apparatus, i.e., a second reaction force, which is applied to the foot of the operator at the time of operating the accelerator pedal shown in FIG. 1, and the rotational angle of the accelerator pedal.

The urging force of the return spring 88 is conducted to the pedal boss 64 through the closing direction stopper 82 without passing through the resistance application device 100, and this urging force of the return spring 88 acts as a second reaction force that is applied to the foot of the operator at the time of depressing the accelerator pedal 87 with the foot of the operator. The second reaction force at the time of depressing the accelerator pedal 87 and the second reaction force at the time of returning the accelerator pedal 87 are equal to each other and change gradually in response to the increase or decrease of the rotational angle of the accelerator pedal 87, as shown in FIG. 7. The relationship between the rotational angle of the accelerator pedal 87 and the second reaction force is the linear relationship.

The urging force of the return spring 88, which is exerted to the accelerator pedal 87 in the accelerator-full-closing position of the accelerator pedal 87 (the accelerator-full-closing time), will be denoted as "Sr1", and the urging force of the return spring 88, which is exerted to the accelerator pedal 87 in the accelerator-full-opening position of the accelerator pedal 87 (the accelerator-full-opening time), will be denoted as "Sr2." In such a case, a second increase rate β of the return spring 88 will be defined by the following equation (4). That is, the second increase rate β is a value, which is obtained by dividing the urging force Sr2 by the urging force Sr1.

$$\beta = Sr2/Sr1 \qquad \text{Equation (4)}$$

Figure 8:
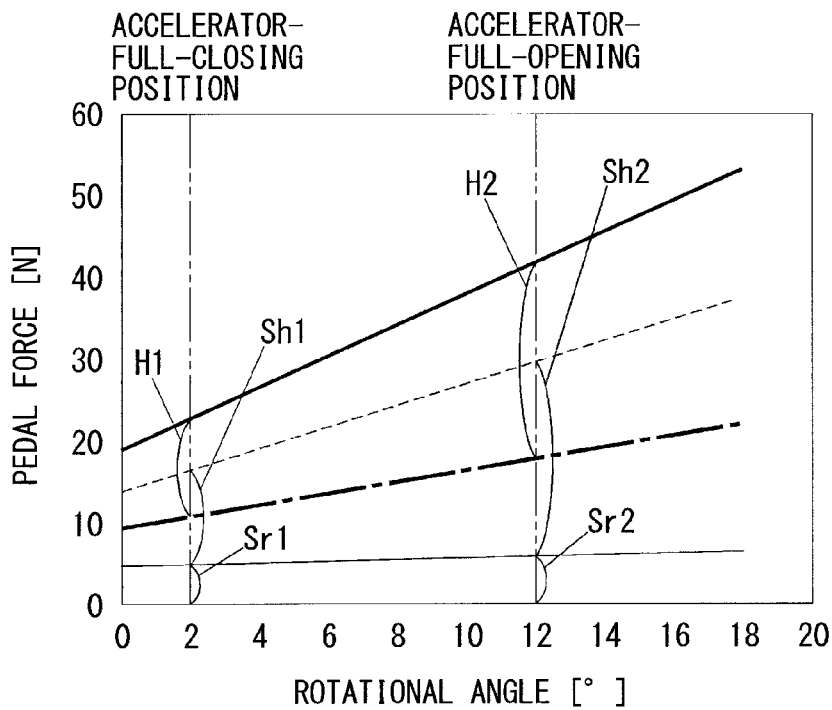
FIG. 8 is a diagram showing a relationship between a pedal force of the accelerator pedal of the accelerator apparatus of FIG. 1 and the rotational angle of the accelerator pedal shown in FIG. 1.

As shown in FIG. 8, the required pedal force, which is required to manipulate the accelerator pedal 87 by the operator, becomes a sum of the first reaction force and the second reaction force. At this time, the rotational resistance force of the resistance application device 100 acts to maintain the rotation of the accelerator pedal 87 at both of the time of depressing the accelerator pedal 87 and the time of returning the accelerator pedal 87. Therefore, at the time of depressing the accelerator pedal 87, the pedal force becomes larger than a sum of the urging force of the hysteresis spring 120 and the urging force of the return spring 88. Thereby, the pedal force becomes smaller than the above-discussed sum at the time of returning the accelerator pedal 87. That is, the resistance application device 100 provides the feature of that the pedal force at the time of returning the accelerator pedal 87 becomes smaller than the pedal force at the time of depressing the accelerator pedal 87. This feature is referred to as a pedal force hysteresis.

In the present embodiment, the first increase rate α and the second increase rate β are set to satisfy the following equation (5). That is, the second increase rate β is smaller than the first increase rate α.

$$\beta < \alpha \qquad \text{Equation (5)}$$

Here, a value, which is obtained by dividing "a pedal force difference between the pedal force at the time of depressing the accelerator pedal 87 and the pedal force at the time of returning the accelerator pedal 87" by "the pedal force at the time of depressing the accelerator pedal 87", will be referred to as a hysteresis ratio h. In such a case, when the equation (5) is satisfied, the hysteresis ratio h2 in the accelerator-full-opening position of the accelerator pedal 87 (the accelerator-full-opening time) becomes larger than the hysteresis ratio h1 in the accelerator-full-closing position of the accelerator pedal 87 (the accelerator-full-closing time). In the present embodiment, the first increase rate α is set to 2 (i.e., α=2), and the second increase rate β is set to 1.2 (i.e., β=1.2). Furthermore, the hysteresis conversion factor K is set to 0.5 (i.e., K=0.5), and the urging force Sh1 is set to 12 (i.e., Sh1=12). Also, the urging force Sh2 is set to 24 (i.e., Sh2=24), and the urging force Sr1 is set to 5 (i.e., Sr1=5). Furthermore, the urging force Sr2 is set to 6 (i.e., Sr2=6). Therefore, the hysteresis ratio h1 becomes 52.2% in the accelerator-full-closing position of the accelerator pedal 87 (i.e., the accelerator-full-closing time), and the hysteresis ratio h2 becomes 57.1% in the accelerator-full-opening position of the accelerator pedal 87 (i.e., the accelerator-full-opening time).

The influence of setting the first increase rate α and the second increase rate β in a manner that establishes the condition of the equation (5) on the hysteresis ratio h will be described in detail. A ratio between the urging force Sr1 and the urging force Sh1, i.e., a value, which is obtained by dividing the urging force Sr1 by the urging force Sh1, will be denoted as γ. Thereby, the hysteresis ratio h1 in the accelerator-full-closing position of the accelerator pedal 87 (i.e., the accelerator-full-closing time) will be indicated by the following equation (6).

$$\begin{aligned} h1 &= H1/(Sh1 + K \times Sh1 + Sr1) & \text{Equation (6)} \\ &= (2K \times Sh1)/(Sh1 + K \times Sh1 + \gamma \times Sh1) \\ &= 2K/(1 + K + \gamma) \end{aligned}$$

On the other hand, the hysteresis ratio h2 at the accelerator full-opening time will be indicated by the following equation (7).

$$\begin{aligned} h2 &= H2/(Sh2 + K \times Sh2 + Sr2) & \text{Equation (7)} \\ &= (2K \times \alpha \times Sh1)/(\alpha \times Sh1 + K \times \alpha \times Sh1 + \\ &\quad \beta \times \gamma \times Sh2) \\ &= 2K/(1 + K + (\beta/\alpha) \times \gamma) \end{aligned}$$

When the equation (6) and the equation (7) are compared with each other, it is understood that the condition, which makes the hysteresis ratio h2 in the accelerator-full-opening position of the accelerator pedal 87 (the accelerator-full-opening time) larger than the hysteresis ratio h1 at the accelerator-full-closing position of the accelerator pedal 87 (the accelerator-full-closing time), is the satisfaction of the equation (5).

As discussed above, the accelerator apparatus 10 of the first embodiment includes the hysteresis spring 120 and the return spring 88. The hysteresis spring 120 exerts the urging force to the second rotor 104 of the resistance application device 100 to urge the second rotor 104 in the accelerator closing direction. The return spring 88 exerts the urging force, which is conducted to the pedal boss 64 without passing through the resistance application device 100 to urge the pedal boss 64 in the accelerator closing direction.

At the time of depressing the accelerator pedal 87, the urging force of the hysteresis spring 120 is conducted to the pedal boss 64 such that the urging force of the hysteresis spring 120 is increased due to the rotational resistance force that is generated by the frictions of the first and second friction members 116, 118 of the resistance application device 100. In contrast, at the time of returning the accelerator pedal 87, the urging force of the hysteresis spring 120 is conducted to the pedal boss 64 such that the urging force of the hysteresis spring 120 is decreased in comparison to the time of depressing the accelerator pedal 87. That is, the urging force of the hysteresis spring 120 has the influence on the pedal force difference, which is the difference between pedal force at the time of depressing the accelerator pedal 87 and the pedal force at the time of returning the accelerator pedal 87.

In contrast, the urging force of the return spring 88 is directly conducted to the pedal boss 64 regardless of the time of depressing the accelerator pedal 87 and the time of returning the accelerator pedal 87. That is, the urging force, which is applied from the return spring 88, does not have the influence on the pedal force difference between pedal force at the time of depressing the accelerator pedal 87 and the pedal force at the time of returning the accelerator pedal 87, and this urging force, which is applied from the return spring 88, is exerted such that the pedal force at the time of depressing the accelerator pedal 87 is increased.

Furthermore, according to the first embodiment, the hysteresis spring 120 and the return spring 88 are set such that the second increase rate β becomes smaller than the first increase rate α.

Therefore, as is understood from the comparison between the equation (6) and the equation (7), the hysteresis ratio in the accelerator-full-opening position of the accelerator pedal 87 (the accelerator-full-opening time) becomes larger than the hysteresis ratio in the accelerator-full-closing position of the accelerator pedal 87 (the accelerator-full-closing time). Thus, the operability of the accelerator pedal 87 can be improved.

Furthermore, according to the first embodiment, the return spring 88 is placed between the closing direction stopper 82, which is formed integrally with the pedal boss 64, and the housing 20. The return spring 88 exerts the urging force, which is conducted to the pedal boss 64 through the closing direction stopper 82 to urge the pedal boss 64 in the accelerator closing direction. Therefore, it is not required to newly provide an engaging element (an engaging means), to which the return spring 88 is engaged. Thus, the number of the components can be reduced or minimized.

Second Embodiment

An accelerator apparatus according to a second embodiment of the present disclosure will be described with reference to FIG. 9.

Figure 9:
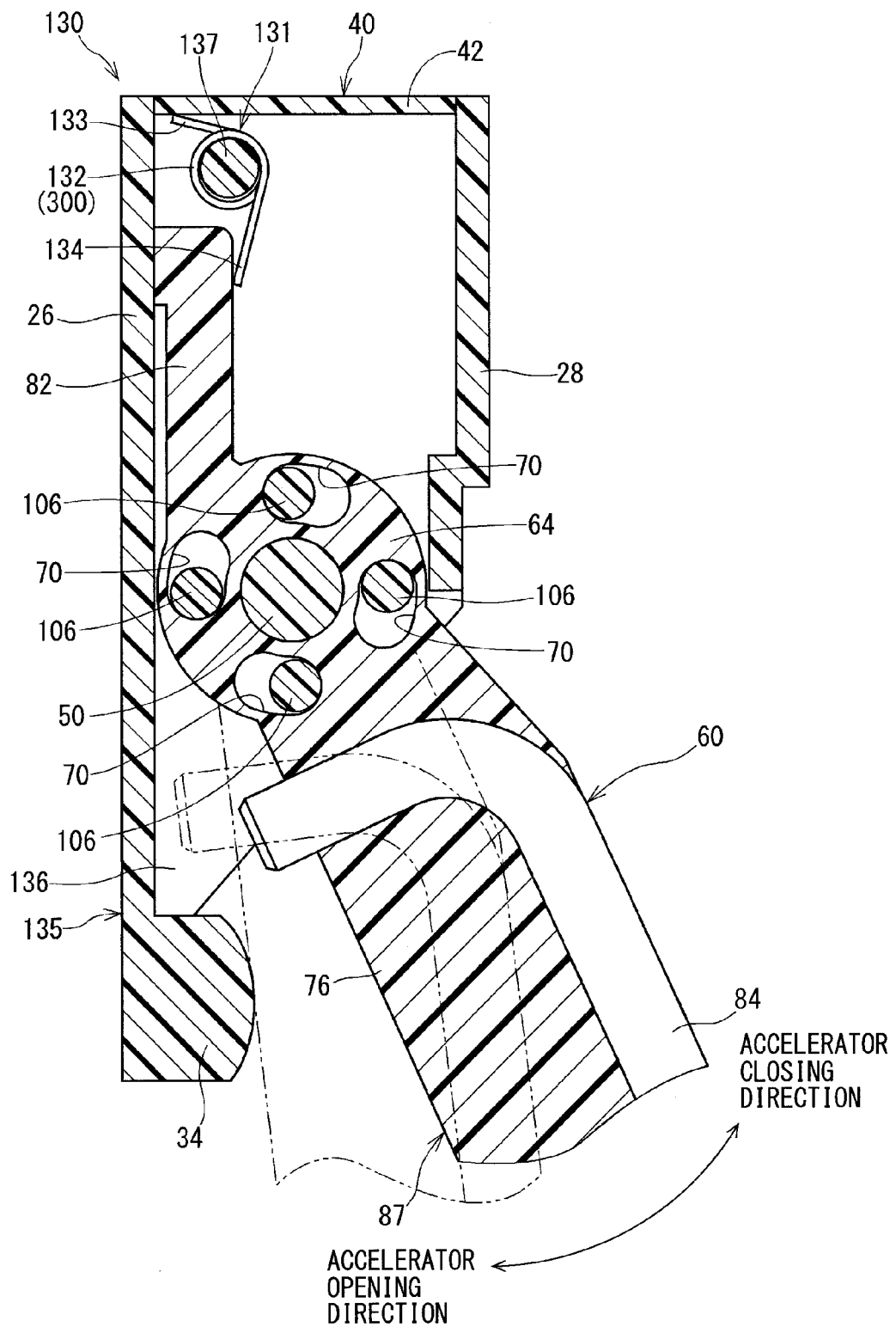
FIG. 9 is a cross-sectional view of an accelerator apparatus according to a second embodiment of the present disclosure.

As shown in FIG. 9, the return spring 131 of the accelerator apparatus 130 of the second embodiment forms the second urging device 300. The return spring 131 is formed as a torsion spring. A wound portion 132 of the return spring 131 is fitted to an installation projection 137, which is formed in the bearing segment 136 of the housing 135. Furthermore, one end portion 133 of the return spring 131 is engaged with the inner surface of the covering portion 42 of the cover 40, and the other end portion 134 of the return spring 131, which is opposite from the one end portion 133, is engaged with the closing direction stopper 82. The closing direction stopper 82 urges the return spring 131 in the loosening direction of the return spring 131 when the closing direction stopper 82 is rotated in the accelerator opening direction. The return spring 131 exerts the urging force to the pedal boss 64 through the closing direction stopper 82 in the accelerator closing direction to urge the pedal boss 64 in the accelerator closing direction.

The second increase rate β' of the return spring 131 (i.e., the second urging device 300), which is formed as the torsion spring, can be easily made smaller than the second increase rate β of the return spring 88, which is formed as the compression coil spring. In the present embodiment, the second increase rate β' is set to 1.1 (i.e., β'=1.1). Therefore, the hysteresis ratio h1 in the accelerator-full-closing position of the accelerator pedal 87 (the accelerator-full-closing time) becomes 52.4%, and the hysteresis ratio h2 in the accelerator-full-opening position of the accelerator pedal 87 (the accelerator-full-opening time) becomes 58.0%. Thus, according to the second embodiment, the hysteresis ratio in the accelerator-full-opening position of the accelerator pedal 87 (the accelerator-full-opening time) can be made larger than the hysteresis ratio in the accelerator-full-closing position of the accelerator pedal 87 (the accelerator-full-closing time). Thereby, the operability of the accelerator pedal 87 can be further improved.

Third Embodiment

An accelerator apparatus according to a third embodiment of the present disclosure will be described with reference to FIG. 10.

Figure 10:
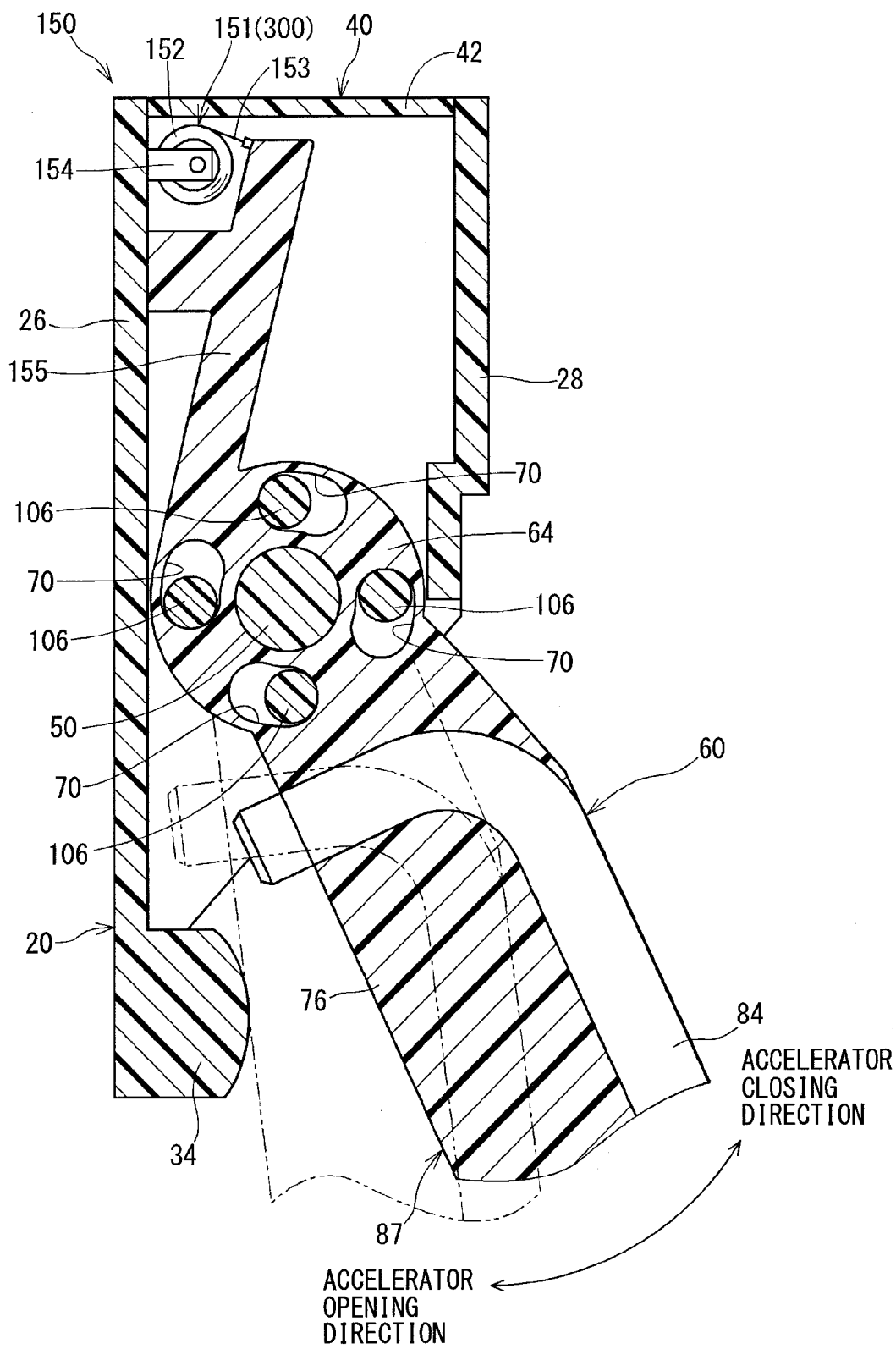
FIG. 10 is a cross-sectional view of an accelerator apparatus according to a third embodiment of the present disclosure.

As shown in FIG. 10, the return spring 151 of the accelerator apparatus 150 of the third embodiment forms the second urging device 300. The return spring 151 is formed as a constant force spring. A wound portion 152 of the return spring 151 is fixed to the connecting segment 26 of the housing 20 through a bracket 154. A distal end portion 153 of the return spring 151 is fixed to the closing direction stopper 155. The closing direction stopper 155 pulls the return spring 151 at the time of rotating the closing direction stopper 155 in the accelerator opening direction. The return spring 151 exerts the urging force to the pedal boss 64 through the closing direction stopper 155 in the accelerator closing direction to urge the pedal boss 64 in the accelerator closing direction.

The second increase rate β" of the return spring 151 (i.e., the second urging device 300), which is formed as the constant force spring, is set to 1 (i.e., β"=1). In the present embodiment, the second increase rate β" is set to 1 (i.e., β"=1), so that the hysteresis ratio h1 in the accelerator-full-closing position of the accelerator pedal 87 (the accelerator-full-closing time) becomes 52.6%, and the hysteresis ratio h2 in the accelerator-full-opening position of the accelerator pedal 87 (the accelerator-full-opening time) becomes 58.8%. Thus, according to the third embodiment, the hysteresis ratio in the accelerator-full-opening position of the accelerator pedal 87 (the accelerator-full-opening time) can be further increased from the hysteresis ratio in the accelerator-full-closing position of the accelerator pedal 87 (the accelerator-full-closing time). Thereby, the operability of the accelerator pedal 87 can be further improved.

Fourth Embodiment

A fourth embodiment of the present disclosure will be described with reference to FIGS. 11 to 13.

Figure 11:
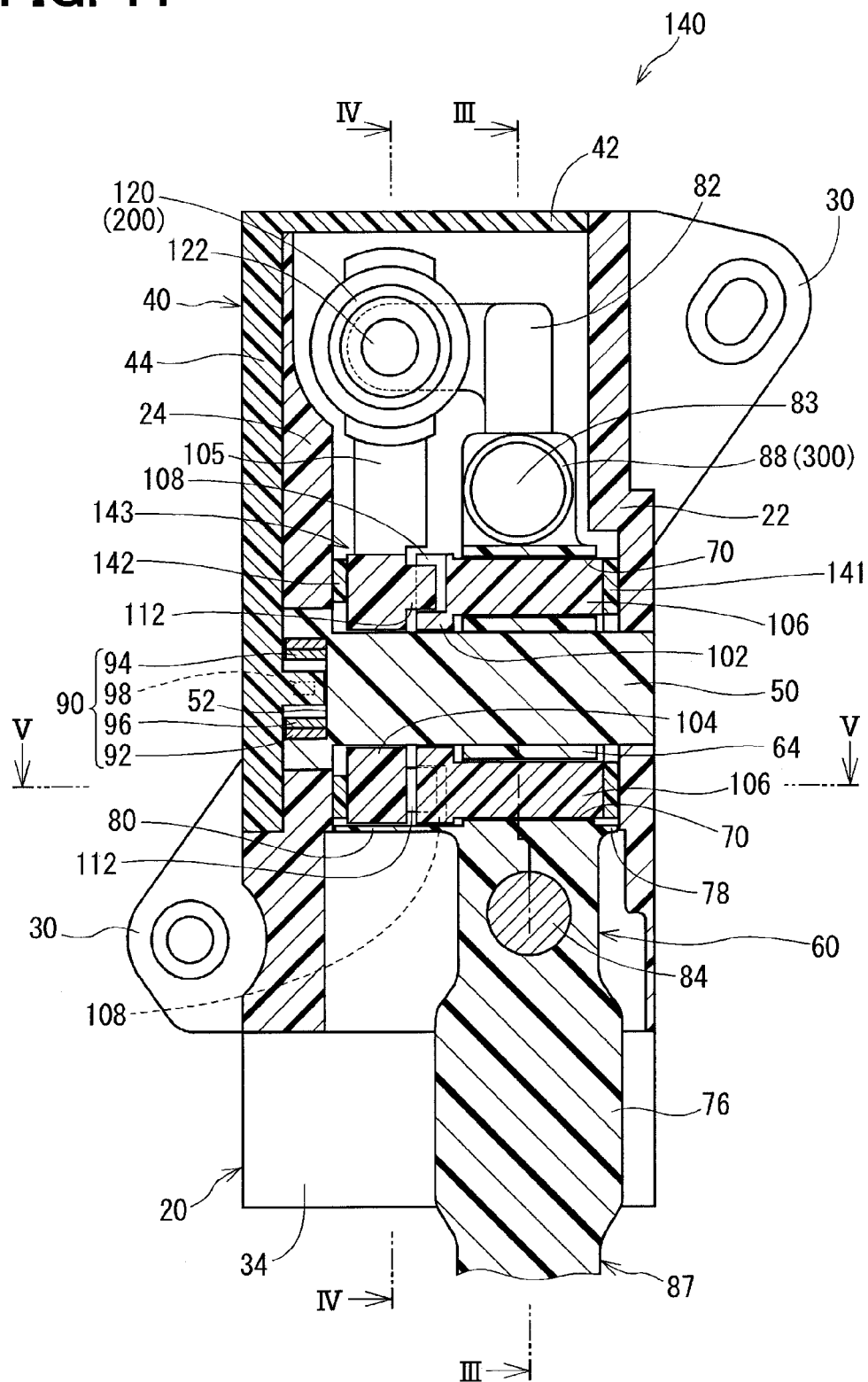
FIG. 11 is a cross-sectional view of an accelerator apparatus according to a fourth embodiment of the present disclosure.
Figure 12:
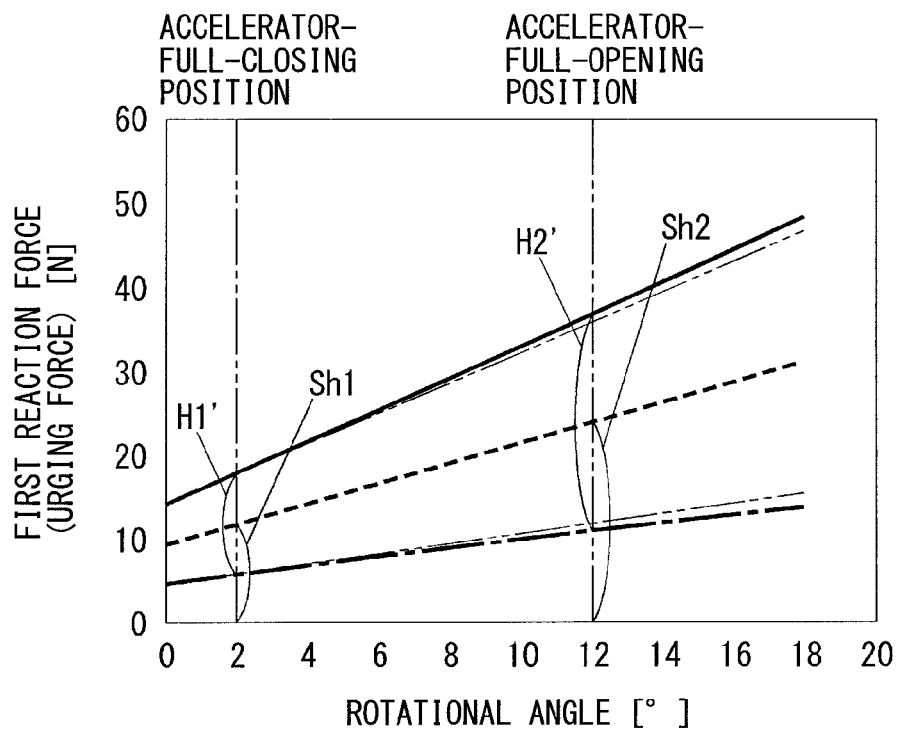
FIG. 12 is a characteristic diagram showing a relationship between a rotational resistance force, which is generated by an urging force of a hysteresis spring and a resistance application device of the accelerator apparatus of FIG. 11, and the rotational angle of the accelerator pedal.

With reference to FIG. 11, according to the fourth embodiment, each of the first friction member 141 and the second friction member 142 of the accelerator apparatus 140 has a property of that a friction coefficient of the friction member 141, 142 is increased when the surface pressure applied to the friction member 141, 142 is increased (hereinafter the property being referred to as a surface pressure dependency of the friction coefficient). Thereby, the rate of increase of the rotational resistance caused by the resistance application device 143 in response to an increase in the rotational angle of the accelerator pedal 87 is increased in comparison to that of the first embodiment. As shown in FIG. 12, the first reaction force is further increased from the first reaction force of the first embodiment indicated by a dot-dot-dash line in FIG. 12 at the time of depressing the accelerator pedal 87. Furthermore, the first reaction force is further reduced from the first reaction force of the first embodiment indicated by a dot-dot-dash line in FIG. 12 at the time of returning the accelerator pedal 87.

Figure 13:
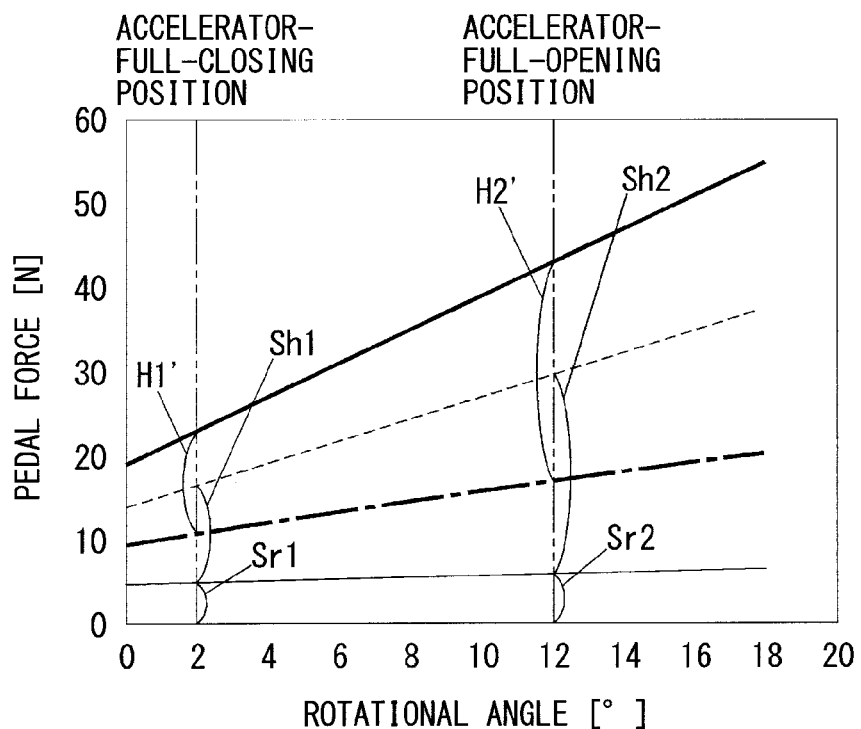
FIG. 13 is a diagram showing a relationship between a pedal force of the accelerator pedal of the accelerator apparatus of FIG. 11 and the rotational angle of the accelerator pedal.

As shown in FIG. 13, in the present embodiment, the first increase rate α is set to 2 (i.e., α=2), and the second increase rate β is set to 1.2 (i.e., β=1.2). The hysteresis conversion factor K is increased when the rotational angle is increased. Furthermore, the hysteresis width H1' is set to 12.2 (i.e., H1'=12.2), and the hysteresis width H2' is set to 26 (i.e., H2'=26). Therefore, the hysteresis ratio h1 in the accelerator-full-opening position of the accelerator pedal 87 (the accelerator-full-opening time) becomes 52.8%, and the hysteresis ratio h2 in the accelerator-full-opening position of the accelerator pedal 87 (the accelerator-full-opening time) becomes 60.5%. Thus, according to the fourth embodiment, the hysteresis ratio in the accelerator-full-opening position of the accelerator pedal 87 (the accelerator-full-opening time) can be further increased from the hysteresis ratio in the accelerator-full-closing position of the accelerator pedal 87 (the accelerator-full-closing time). Thereby, the operability of the accelerator pedal 87 can be further improved.

Now, modifications of the above embodiments will be described.

In a modification of the above embodiments, the second increase rate of the return spring (i.e., the second urging device) can be set to any value as long as the second increase rate of the return spring is smaller than the first increase rate of the hysteresis spring (i.e., the first urging device).

Furthermore, in another modification of the above embodiments, the return spring is not limited to the compression coil spring. For example, the return spring may be any other suitable type of urging element, such as a leaf spring or a torsion spring. Also, instead of providing the single return spring, a plurality of return springs may be provided to form the second urging device (the second urging means). In such a case, different types of returns springs may be provided to form the second urging device. For instance, any two or more of the return spring of the first embodiment, the return spring of the second embodiment and the return spring of the third embodiment may be combined together to form the second urging device.

In another modification of the above embodiments, the return spring may be configured to directly urge the pedal boss.

In another modification of the above embodiments, the return spring may be made as a torsion spring, and the first friction member and the second friction member may be constructed to have the surface pressure dependency.

In another modification of the above embodiments, only one of the first friction member and the second friction member may have the surface pressure dependency.

Furthermore, in another modification of the above embodiments, the hysteresis spring is not limited to the compression coil spring or the torsion spring. For example, the hysteresis spring may be made as a leaf spring, a torsion spring or the like. Furthermore, instead of providing the single hysteresis spring, a plurality of hysteresis springs may be provided to form the first urging device (the first urging means). In such a case, different types of hysteresis springs may be provided to form the second urging device.

In another modification of the above embodiments, the hysteresis spring may be configured to directly urge the second rotor.

In another modification of the above embodiments, the rotational angle of the accelerator pedal is not necessarily within the range of 0 to 18 degrees and may be changed within any other appropriate range.

In another modification of the above embodiments, the pedal boss and the projections of the first rotor may be eliminated. In such a case, the accelerator pedal may be directly connected or joined to the first rotor. Furthermore, in such a case, the return spring may be modified such that the return spring exerts the urging force, which is conducted to the accelerator pedal without passing through the first bevel gear teeth and the second bevel gear teeth to urge the accelerator pedal in the accelerator closing direction. For example, the return spring may be configured to urge the first rotor.

In another modification of the above embodiments, the accelerator-full-closing position of the accelerator pedal may be set to any other appropriate position, which is other than the rotational angle of 2 degrees, and the accelerator-full-opening position of the accelerator pedal may be set to any other appropriate position, which is other than the rotational angle of 12 degrees.

The accelerator-full-closing position and the accelerator-full-opening position of the accelerator pedal may be set to substantially coincide with an actual full closing position and an actual full opening position, respectively, of the throttle valve (e.g., the butterfly valve). Alternatively, the accelerator-full-closing position and the accelerator-full-opening position of the accelerator pedal may be set based on the actual full closing position and the actual full opening position, respectively, of the throttle valve (e.g., the butterfly valve). In other words, the accelerator-full-closing position and the accelerator-full-opening position of the accelerator pedal may not need to substantially coincide with the actual full closing position and the actual full opening position, respectively, of the throttle valve as long as the accelerator-full-closing position and the accelerator-full-opening position of the accelerator pedal are set in view of the actual full closing position and the actual full opening position, respectively, of the throttle valve. For instance, in the above embodiments, the accelerator-full-closing position of the accelerator pedal is set at the rotational angle of 2 degrees (or the rotational angle adjacent to 2 degrees) for the following reason.

Specifically, the accelerator-full-closing position of the accelerator pedal is set as a rotational position of the accelerator pedal, at which the pedal force applied from the foot of the driver to the accelerator pedal can be stably measured for the first time at the time of rotating the accelerator pedal in the accelerator opening direction from the rotational angle of 0 degrees (the released position of the accelerator pedal). Here, it should be noted that even when the pedal force is applied to the accelerator pedal from the foot of the driver, it is difficult to measure the applied pedal force at the rotational angle of 0 degrees of the accelerator pedal due to the fact that the pedal force is not yet stably applied to the accelerator pedal at the rotational angle of 0 degrees. In contrast, the pedal force applied to the accelerator pedal can be stably measured at the rotational angle of 2 degrees. This is the reason why the accelerator-full-closing position of the accelerator pedal is set at the rotational angle of 2 degrees (or the rotational angle adjacent to 2 degrees). Therefore, in some cases, the accelerator-full-closing position of the accelerator pedal may be set at a rotational angle of 3 degrees (or the rotational angle adjacent to 3 degrees) depending on the applied design principle. Also, the accelerator-full-closing position of the accelerator pedal is set at the rotational angle of 12 degrees in view of the pedal force in the above embodiments.

Furthermore, in the above embodiments, the first increase rate of the hysteresis spring (the first urging device) is obtained by dividing the urging force of the hysteresis spring, which is exerted to the accelerator pedal in the accelerator-full-opening position of the accelerator pedal, by the urging force of the hysteresis spring, which is exerted to the accelerator pedal in the accelerator-full-closing position of the accelerator pedal. Also, the second increase rate of the return spring (the second urging device) is obtained by dividing the urging force of the return spring, which is exerted to the accelerator pedal in the accelerator-full-opening position of the accelerator pedal, by the urging force of the return spring, which is exerted to the accelerator pedal in the accelerator-full-closing position of the accelerator pedal. However, the first increase rate of the hysteresis spring (the first urging device) and the second increase rate of the return spring (the second urging device) may be obtained at different rotational angles of the accelerator pedal, which are different from the accelerator-full-closing position and the accelerator-full opening position discussed above.

For example, the first increase rate of the hysteresis spring (the first urging device) may be obtained by dividing the urging force of the hysteresis spring, which is exerted to the accelerator pedal in a second rotational position of the accelerator pedal, by the urging force of the hysteresis spring, which is exerted to the accelerator pedal in a first rotational position of the accelerator pedal. Here, the second rotational position is be located on one side of the first rotational position in the accelerator opening direction. The first rotational position and the second rotational position may be set to any rotational angles, respectively, as long as the rotational angle of the second rotational position, which is measured from the released position of the accelerator pedal in the accelerator opening direction, is larger than the rotational angle of the first rotational position, which is measured from the released position of the accelerator pedal in the accelerator opening direction.

For instance, in the case where the rotatable angular range of the accelerator pedal is 0 to 18 degrees (see the case of FIG. 6), the first rotational position of the accelerator pedal may be set in a first-half (0 to 9 degrees) of the rotatable angular range of the accelerator pedal from the released position of the accelerator pedal where no pedal force is applied to the accelerator pedal, and the second rotational position of the accelerator pedal may be set in a second half (10 to 18 degrees) of the rotatable angular range of the accelerator pedal, which is located on one side of the first-half of the rotatable angular range of the accelerator pedal in the accelerator opening direction. Even in such a case, the second increase rate is smaller than the first increase rate. This is made possible due to the fact that the spring constant of the hysteresis spring (the first urging device) is set to be larger than the spring constant of the return spring (the second urging device). Furthermore, the accelerator-full-closing position of the accelerator pedal may be set at any rotational angle in the first-half of the rotatable angular range of the accelerator pedal, and the accelerator-full-opening position of the accelerator pedal may be set at any rotational angle in the second-half of the rotatable angular range of the accelerator pedal, if desired. In such a case, the accelerator-full-closing position of the accelerator pedal may be treated as the first rotational position of the accelerator pedal discussed above, and the accelerator-full-opening position of the accelerator pedal may be treated as the second rotational position of the accelerator pedal discussed above.

The number of the projections of the first rotor is not limited to four. That is, the number of the projections may be other than four (i.e., may be larger than four or smaller than four).

Furthermore, in another modification of the above embodiments, the first friction member and the second friction member may be fixed to the housing.

In another modification of the above embodiments, the resistance application device may be any other suitable type, which is other than the bevel gear type.

Furthermore, in another modification of the above embodiments, the rotational position sensor does not need to use the magnets and the Hall element. As long as the rotational position sensor can sense the rotational position of the shaft, any other appropriate type of rotational position sensor may be used.

The present disclosure is not limited the above embodiments and modifications thereof. That is, the above embodiments and modifications thereof may be modified in various ways without departing from the principle of the present disclosure.

What is claimed is:

1. An accelerator apparatus comprising:
    a support member that is installable to a body of a vehicle;
    an accelerator pedal that is rotatably supported by the support member;
    a rotational angle sensing device that senses a rotational angle of the accelerator pedal relative to the support member;
    a resistance force application device that applies a rotational resistance force to the accelerator pedal such that the rotational resistance force is increased when a rotational angle of the accelerator pedal from an accelerator-full-closing position of the accelerator pedal is increased;
    a first urging device that urges the accelerator pedal in an accelerator closing direction through the resistance force application device; and
    a second urging device that urges the accelerator pedal in the accelerator closing direction without using the resistance force application device, wherein:
    a first ratio is defined as a value that is obtained by dividing an urging force of the first urging device at an accelerator-full-opening time by an urging force of the first urging device at an accelerator-full-closing time;
    a second ratio is defined as a value that is obtained by dividing an urging force of the second urging device at the accelerator-full-opening time by an urging force of the second urging device at the accelerator-full-closing time; and
    the second ratio is smaller than the first ratio.

2. The accelerator apparatus according to claim 1, wherein the second urging device includes a constant force spring.

3. The accelerator apparatus according to claim 1, wherein the second urging device includes a torsion spring.

4. The accelerator apparatus according to claim 1, wherein:
    the resistance force application device includes:
        a rotor that is urged toward the support member by a force that is increased when the rotational angle of the accelerator pedal from the accelerator-full-closing position is increased; and
        a friction member that is placed between the rotor and the support member, wherein when the rotor is urged toward the support member, the friction member is frictionally engaged with one of the rotor and the support member to apply a rotational resistance force to the rotor; and
    a friction coefficient of the friction member is increased when a surface pressure applied to the friction member is increased.

5. The accelerator apparatus according to claim 1, further comprising a closing-direction stopper that limits rotation of the accelerator pedal in the accelerator closing direction when the closing-direction stopper contacts the support member, wherein the second urging device is placed between the closing-direction stopper and the support member and urges the accelerator pedal in the accelerator closing direction through the closing-direction stopper.

* * * * *